(12) United States Patent
Suda et al.

(10) Patent No.: US 7,075,912 B2
(45) Date of Patent: Jul. 11, 2006

(54) WIRELESS COMMUNICATION SYSTEM USING ACCESS POINTS THAT CAN BE FREELY SET UP BY USERS

(75) Inventors: Hirohito Suda, Yokosuka (JP); Masayoshi Nakayama, Zushi (JP); Katsutoshi Nidaira, Yokosuka (JP); Shuichi Yoshino, Yokohama (JP); Masahiro Umehira, Yokohama (JP); Eisuke Kudo, Sendai (JP); Syuji Kubota, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1019 days.

(21) Appl. No.: 10/099,038

(22) Filed: Mar. 15, 2002

(65) Prior Publication Data
US 2002/0151300 A1 Oct. 17, 2002

(30) Foreign Application Priority Data
Mar. 16, 2001 (JP) ............................ P2001-076531
Feb. 21, 2002 (JP) ............................ P2002-045240

(51) Int. Cl.
*G04Q 7/00* (2006.01)

(52) U.S. Cl. ....................................... 370/331; 455/411
(58) Field of Classification Search ...................... None
See application file for complete search history.

(56) References Cited

U.S. PATENT DOCUMENTS

| 5,577,101 A | * | 11/1996 | Bohm ......................... 455/406 |
| 5,670,950 A | | 9/1997 | Otsuka |
| 6,128,485 A | * | 10/2000 | Mori et al. ............... 455/422.1 |
| 2005/0287988 A1 | * | 12/2005 | Nakamura .................. 455/411 |

FOREIGN PATENT DOCUMENTS

| JP | 06-120886 | 4/1994 |
| JP | 06-311099 | 11/1994 |
| JP | 2002-077462 | 3/2002 |
| WO | WO 00/28752 | 5/2000 |

* cited by examiner

*Primary Examiner*—Chau Nguyen
*Assistant Examiner*—Jung Park
(74) *Attorney, Agent, or Firm*—Brenda O. Holmes; Kilpatrick Stockton LLP

(57) ABSTRACT

In a wireless communication system formed by a plurality of access points constituting a wireless network, through which user terminals make accesses, and at least one control station configured to control the access points, public access points are systematically set up by a manager of the control station, while user's personal access points to be freely set up by users at desired locations according to needs of users are accommodated by operating the control station to measure a utilization level of each user's personal access point and charge an owner of each user's personal access point according to a measured utilization level and set up relay routes using the public access points and the user's personal access points.

33 Claims, 11 Drawing Sheets

(1) MUTUAL AUTHENTICATION BETWEEN ACCESS POINT & CONTROL STATION
(2) MUTUAL AUTHENTICATION BETWEEN USER TERMINAL & ACCESS POINT
(3) MUTUAL AUTHENTICATION BETWEEN USER TERMINAL & CONTROL STATION, USER TERMINAL (MEMBER) PERMISSION

WIRELESS COMMUNICATION SYSTEM USING ACCESS POINTS THAT CAN BE FREELY SET UP BY USERS

BACKGROUND OF THE INVENTION

1. Field of the Invention

The present invention relates to a wireless communication system using wireless terminals and access points which are connected through wireless links, which is suitable for a mobile communication system such as PHS (Personal Handy-phone System) or a nomadic communication system, or for use in conjunction with these systems.

2. Description of the Related Art

The conventional wireless communication system can be largely classified into a scheme in which a system constructed by a communication service provider by setting up access points is utilized by users in exchange to payment of fees as in the cellular telephone system or the PHS, and a scheme in which a system is constructed and utilized by the users themselves as in the wireless LAN system.

In order to construct the cellular telephone system or the PHS, the communication service provider is required to make a huge initial investment for setting up access point equipments and carry out negotiations for the set up of access point equipments with owners of planned set up locations. By setting up many access points despite of such burdens, it becomes possible to secure a wide service area which is advantageous in attracting many users.

On the other hand, a wireless system to be set up by users themselves such as the wireless LAN system, a desired system of the users can be freely constructed, but its service area will be limited within a region or a building that can be freely used by the users, so that it cannot be utilized at locations other than that at which the system is set up by the users themselves. Also, in such a private wireless communication system of users, a control for sharing areas by mutual cooperation is not presupposed so that the system efficiency can be largely degraded due to a conflict that can be caused when areas set up by a plurality of users overlap.

As described, the conventional wireless communication systems include a system constructed by the communication service provider and a system constructed by the users themselves, which are associated with respective pros and cons.

Namely, in the case where the communication service provider constructs the system, there are problems regarding the huge initial investment and the time and efforts required in securing access point set up locations. Also, from a viewpoint of the users, there are cases where the system constructed by the communication service provider does not necessarily meet the actual needs of the users. However, it is possible to secure a wide service area in this case.

On the other hand, in the case where the users construct the system themselves, it is possible to construct a system that accounts for the actual needs of the users, but it is difficult to secure a wide service area.

BRIEF SUMMARY OF THE INVENTION

It is therefore an object of the present invention to provide a wireless communication system in which a system with a wide service area that can meet the actual needs of the users can be constructed by the users themselves while reducing the burden on the communication service provider.

It is another object of the present invention to provide a wireless communication system capable of improving the fairness of the costs to be accounted by the users.

According to one aspect of the present invention there is provided a wireless communication system, comprising: a plurality of access points constituting a wireless network, through which user terminals make accesses; and at least one control station configured to control the access points; wherein the access points include public access points which are systematically set up by a manager of the control station, and the control station is adapted to accommodate user's personal access points to be freely set up by users at desired locations according to needs of users, the control station having: a server unit configured to measure a utilization level of each user's personal access point and charge an owner of each user's personal access point according to a measured utilization level; and a router unit configured to set up relay routes using the public access points and the user's personal access points.

According to another aspect of the present invention there is provided a control station apparatus for use in a wireless communication system formed by a plurality of access points constituting a wireless network, through which user terminals make accesses, and at least one control station configured to control the access points, the access points including public access points which are systematically set up by a manager of the control station, the control station apparatus being adapted to accommodate user's personal access points to be freely set up by users at desired locations according to needs of users and comprising: a server unit configured to measure a utilization level of each user's personal access point and charge an owner of each user's personal access point according to a measured utilization level; and a router unit configured to set up relay routes using the public access points and the user's personal access points.

According to another aspect of the present invention there is provided an access point apparatus for use as a user's personal access point in a wireless communication system formed by a plurality of access points constituting a wireless network, through which user terminals make accesses, and at least one control station configured to control the access points, the access points including public access points which are systematically set up by a manager of the control station, the control station being adapted to accommodate user's personal access points to be freely set up by users at desired locations according to needs of users, and the access point apparatus comprising: an authentication processing unit configured to carry out a mutual authentication with the control station, a mutual authentication with the user terminal after the mutual authentication with the control station is successfully completed, and relay information for a mutual authentication between the user terminal and the control station after the mutual authentication with the control station is successfully completed and the mutual authentication with the user terminal is successfully completed; and a router unit configured to set up relay routes using the public access points and the user's personal access points.

According to another aspect of the present invention there is provided a method for operating a wireless communication system formed by a plurality of access points constituting a wireless network, through which user terminals make accesses, and at least one control station configured to control the access points, the method comprising the steps of: systematically setting up public access points by a manager of the control station, and accommodating user's personal access points to be freely set up by users at desired locations according to needs of users, by operating the control station to measure a utilization level of each user's personal access point and charge an owner of each user's personal access point according to a measured utilization level, and set up relay routes using the public access points and the user's personal access points.

Other features and advantages of the present invention will become apparent from the following description taken in conjunction with the accompanying drawings.

DETAILED DESCRIPTION OF THE INVENTION

First, the major features of the wireless communication system according to the present invention will be briefly summarized.

The wireless communication system of the present invention has a plurality of access points and a control station for controlling these plurality of access points. The access points include public access points which are systematically set up by a manager of the control station, and the system is also capable of accommodating user's personal access points to be freely set up by the users at desired locations according to the needs of the users.

The control station has a unit for measuring a utilization level of each user's personal access point, a unit for charging an owner (charging target user) of each user's personal access point according to the measured utilization level by accounting for a frequency by which each user's personal access point is utilized by users other than the owner (charging target user) of each user's personal access point, and a unit for setting up relay routes using the public access points and the user's personal access points.

In this wireless communication system, the users themselves can set up the user's personal access points according to the needs of the users, so that it is possible to construct a system that can meet the needs of the users. At this point, the communication service provider who is the manager of the control station is not required to make the initial investment regarding the set up of the user's personal access points and secure locations for setting up the user's personal access points, so that the system can be expanded easily. Also, the users can utilize the public access points other than the user's personal access point set up by themselves so that it is possible to utilize the system over a wide service area.

In this wireless communication system, the communication service provider is required to comprehend a set up state of the user's personal access points that can be set up at arbitrary locations and their utilization states, set up relay routes such that communications can be carried out efficiently by effectively utilizing these user's personal access points, and charge the users. There are also cases where there is a need for the communication service provider to set up new access points in order to interpolate the user's personal access points set up by the users, but the investment required for the communication service provider can be considerably reduced compared with the conventional system in which the communication service provider is required to set up all the access points.

The control station should preferably have a unit for authenticating the user and the user's personal access point set up by the user, and a unit for determining whether or not to permit a connection between the wireless terminal of the user and the user's personal access point according to the authentication result. In this way, it becomes possible to realize a service for preventing illegal interventions of the others with respect to the system utilization among the specific user groups.

Also, it is possible to set up service classes with respect to the users, and provide the control station with a unit for controlling a priority level of a connection to the system and a communication quality of the relay route according to the service class. In this way, it becomes possible to realize a service in which the users are distinguished according to their service classes.

For example, it is possible to realize a service in which those users who prefer the cheaper communication fee even if that requires somewhat lower connection priority level and relay route communication quality and those users who prefer the high connection priority level and relay route communication quality even if that requires somewhat higher communication fee are distinguished.

It is also possible to use a plurality of control stations which are inter-connected and provide each control station with a unit for carrying out inter-control station communications. In this way, it is possible to realize a processing to be carried out by the cooperation of a plurality of the control stations. For example, it is possible to carry out communications through an access point managed by another control station.

It is also possible for the charging unit of the control station to discount the utilization fee of each user's personal access point according to the frequency by which each user's personal access point is utilized by users other than the owner (charging target user) of each user's personal access point. To this end, it is possible for each control station to notify the measured utilization level of the access point managed by each control station to the other control stations, by utilizing the inter-control station communications mentioned above.

In this case, when the user's personal access point set up by the user is frequently utilized by the other users, the communication service provider can discount the access point utilization fee with respect to that user who set up the user's personal access point with the high utilization frequency by the other users, such that this user can receive an economical merit. In this way, it is possible to improve the fairness of the costs to be accounted by the users. It is also possible to expect the effect for promoting the set up of the user's personal access point by the user, so that it is effective in realizing the service area expansion.

Referring now to FIG. 1 to FIG. 4, one embodiment of a wireless communication system according to the present invention will be described in detail.

Figure 1:
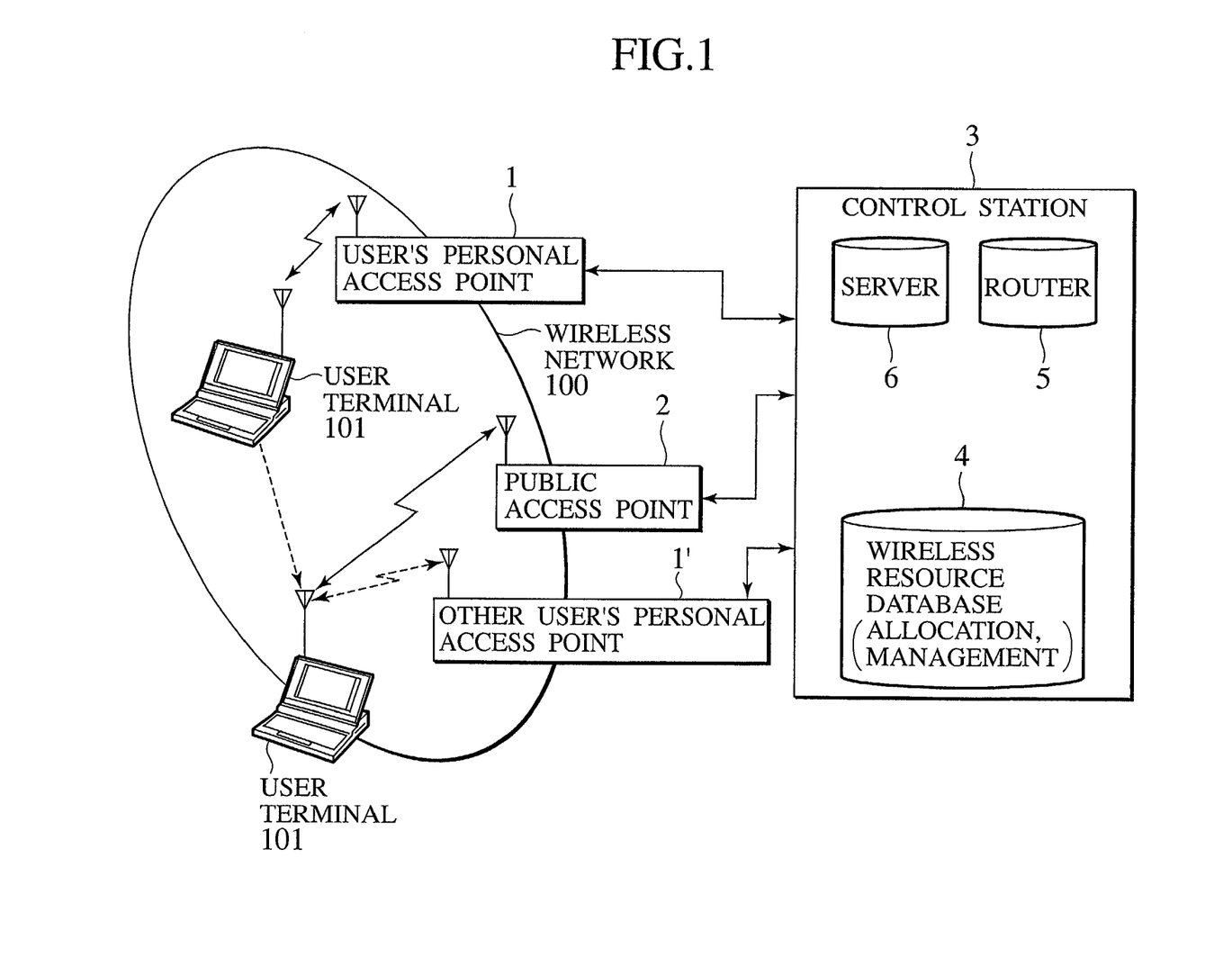
FIG. 1 is a diagram showing one exemplary overall configuration of a wireless communication system according to one embodiment of the present invention.

FIG. 1 shows an exemplary overall configuration of the wireless communication system in this embodiment. As shown in FIG. 1, the wireless communication system has a plurality of access points 1 and 2 constituting a wireless network 100 to which a user terminal 101 can make accesses, and a control station 3 for controlling these plurality of access points 1 and 2.

The access points 1 and 2 include a public access point 2 which is systematically set up by a manager of the control station 3, and the system is also capable of accommodating an user's personal access point 1 to be freely set up by the user at a desired location according to the need of the user, as well as an other user's personal access point 1' to be freely set up by the other user at a desired location according to the need of the other user. An equipment for the user's personal access point 1 can be either rented from the communication service provider or purchased by the user.

The control station 3 has a wireless resource database 4 for measuring a utilization level of the user's personal access point 1, a server 6 for charging the owner (charging target user) of the user's personal access point 1 according to the measured utilization level by accounting for a frequency by which the user's personal access point 1 is utilized by users other than the owner (charging target user) of the user's personal access point 1, and a router 5 for setting up a relay route using the public access point 2 and the user's personal access point 1.

The server 6 of the control station 3 also carries out the authentication of the user and the user's personal access point 1 set up by the user, and determines whether or not to permit a connection between the wireless terminal of the user and the user's personal access point 1 or the public access point 2 according to the authentication result. Also, service classes are set up with respect to the users, and the server 6 of the control station 3 controls a priority level of a connection to the system and a communication quality of the relay route according to the service class.

In the case of using a plurality of control stations 3, these control stations 3 are inter-connected such that each control station 3 can carry out inter-control station communications with any other control station 3.

Figure 4:
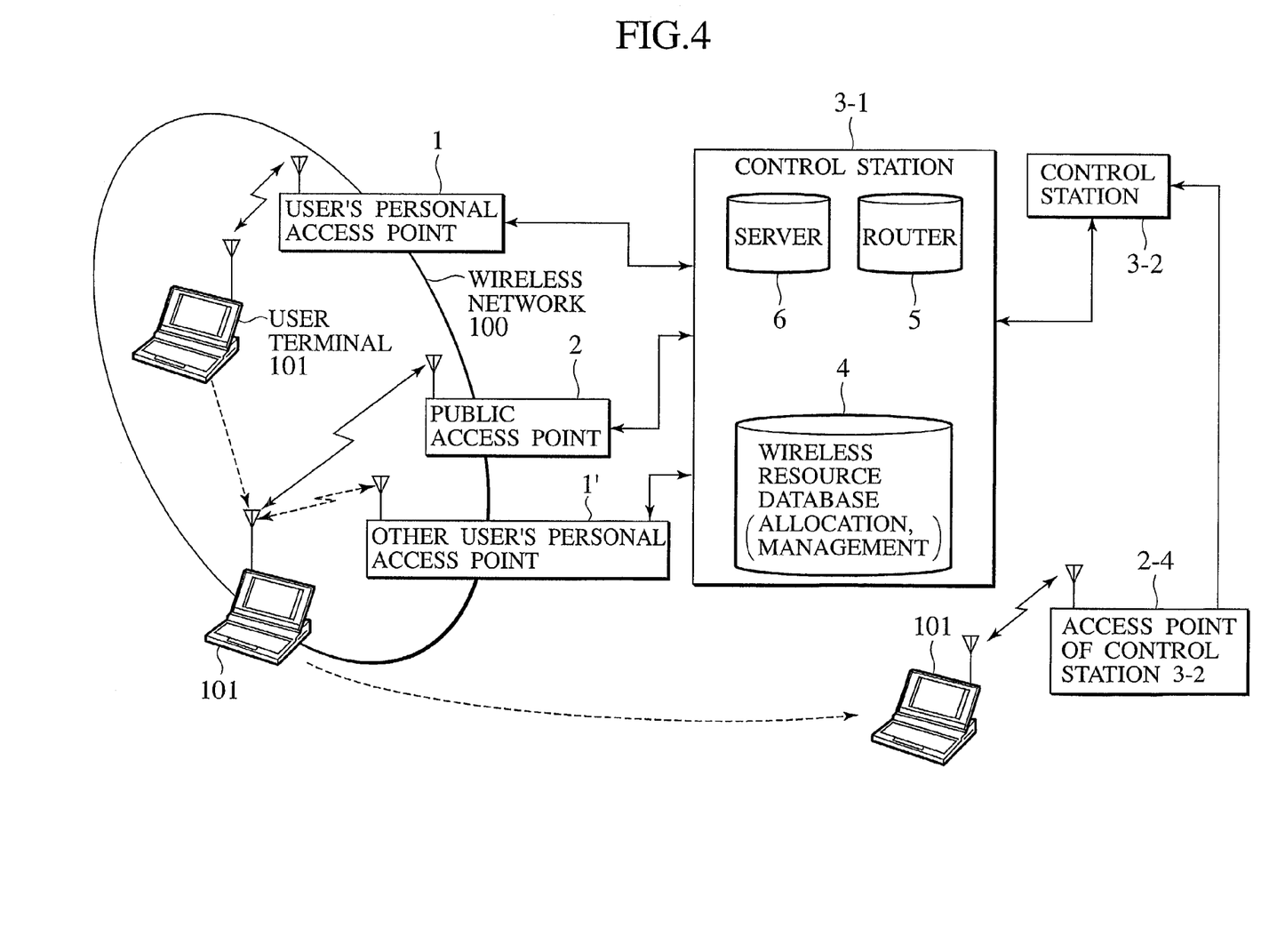
FIG. 4 is a diagram showing another exemplary overall configuration of a wireless communication system according to one embodiment of the present invention, for explaining an authentication method over a plurality of control stations.

In this way, it is possible to carry out communications through an access point managed by another control station as shown in FIG. 4, for example. Namely, when the user who set up the user's personal access point 1 attempts to make a network access through an access point managed by another control station, the inter-control station communications can be utilized in order to inquire data necessary for the authentication and permission processing to the control station 3 that manages the user's personal access point 1 of this user.

Also, the server 6 of the control station 3 gives a benefit to the owner (charging target user) of the user's personal access point 1 according to the utilization level based on the frequency by which the user's personal access point 1 is utilized by users other than the owner (charging target user) of the user's personal access point 1. Here, the benefit to be given to the owner (charging target user) can be a discount of a network access fee, a membership fee, or a communication fee for utilizing the other access points that is to be paid by this user. Also, the benefit to be given to the owner (charging target user) can be points according to the utilization level, such that the accumulated points can be exchanged with a normally charged service provided by the system or with a gift. Also, the benefit to be given to the owner (charging target user) can be the upgrading of a network connection priority level or the packet priority level, or the upgrading of the membership grade from a normal membership to a premium membership either temporarily or permanently when there is a premium membership with a higher priority level which normally requires a higher membership fee.

To this end, it is possible for the plurality of control stations 3 that manage the plurality of access points to notify the measured utilization levels with each other by carrying out the inter-control station communications. Namely, when the user is to be charged according to the utilization levels by which the user has utilized the other access points, the utilization level of the user for utilizing the other access point is managed by that other access point, and the inter-control station communications can be utilized in order for the control station that manages the user's personal access point of this user to collect the utilization levels of this user from the other control stations.

In the following, the wireless communication system of this embodiment will be described in further detail.

As shown in FIG. 1, the wireless communication system of this embodiment contains the user's personal access point 1 that is set up by the user and the public access point 2 (or the other user's personal access point 1'). In FIG. 1, the access point 1 is set up at a home of the user, such that the user can carry out communications by using the access point 1 while the user is at the home. When the user goes out of the home, the user can carry out communications by using the access point 2.

The control station 3 has the wireless resource database 4, the router 5 and the server 6. The wireless resource database 4 manages a set up information and a utilization information of each access point, and carries out the adaptive allocation of radio frequencies for the purpose of suppressing radio interferences and increasing a communication capacity. The router 5 sets up an optimal relay route in a specified section according to the set up information managed by the wireless resource database 4. The server 6 carries out the authentication processing for the user and the charging processing based on the utilization information managed by the wireless resource database 4. Also, the server 6 controls the connection priority level and the relay route communication quality according to the service class of the user by distributing the wireless resource amounts in view of QoS (Quality of Services) or CoS (Cost of Services) according to the service class of the user.

Here, the procedure for the user to access the wireless communication system by using the public access point 2 (or the other user's personal access point 1') will be described. While the user is at the home, the user sets an authentication key such as a password into the server 6 of the control station 3 by carrying out communications between the user terminal 101 and the access point 1 at the home. When the user moves to the public place or the other user's home, the user sends his own authentication key to the control station 3 via the access point 2. The server 6 of the control station 3 verifies the legitimacy of the user by matching this authentication key received via the access point 2 with the authentication key of the access point 1, and permits this user to carry out communications using the access point 2 by sending the authentication notice to the user terminal 101 via the access point 2. Here, the legitimate user is a user who himself has set up an access point such that this user has a right to utilize the other access points.

In addition, the server 6 carries out the charging processing with respect to the user of the access point 1. Here, the charging processing regarding the access point utilization fee is carried out in addition to the conventionally carried out charging processing regarding the communication fee. The access point utilization fee is determined monthly or yearly, but the use of the access point 1 by users other than the user of the access point 1 is permitted here, so that the processing for counting a frequency by which the access point 1 is utilized by users other than the user who is the owner of the access point 1 and discounting the access point utilization fee according to the counted frequency is also carried out.

The style of charging in this embodiment can be a meter rate or a fixed rate. In the case of using the fixed rate, the fixed utilization fee will be increased or decreased according to the utilization level.

Figure 2:
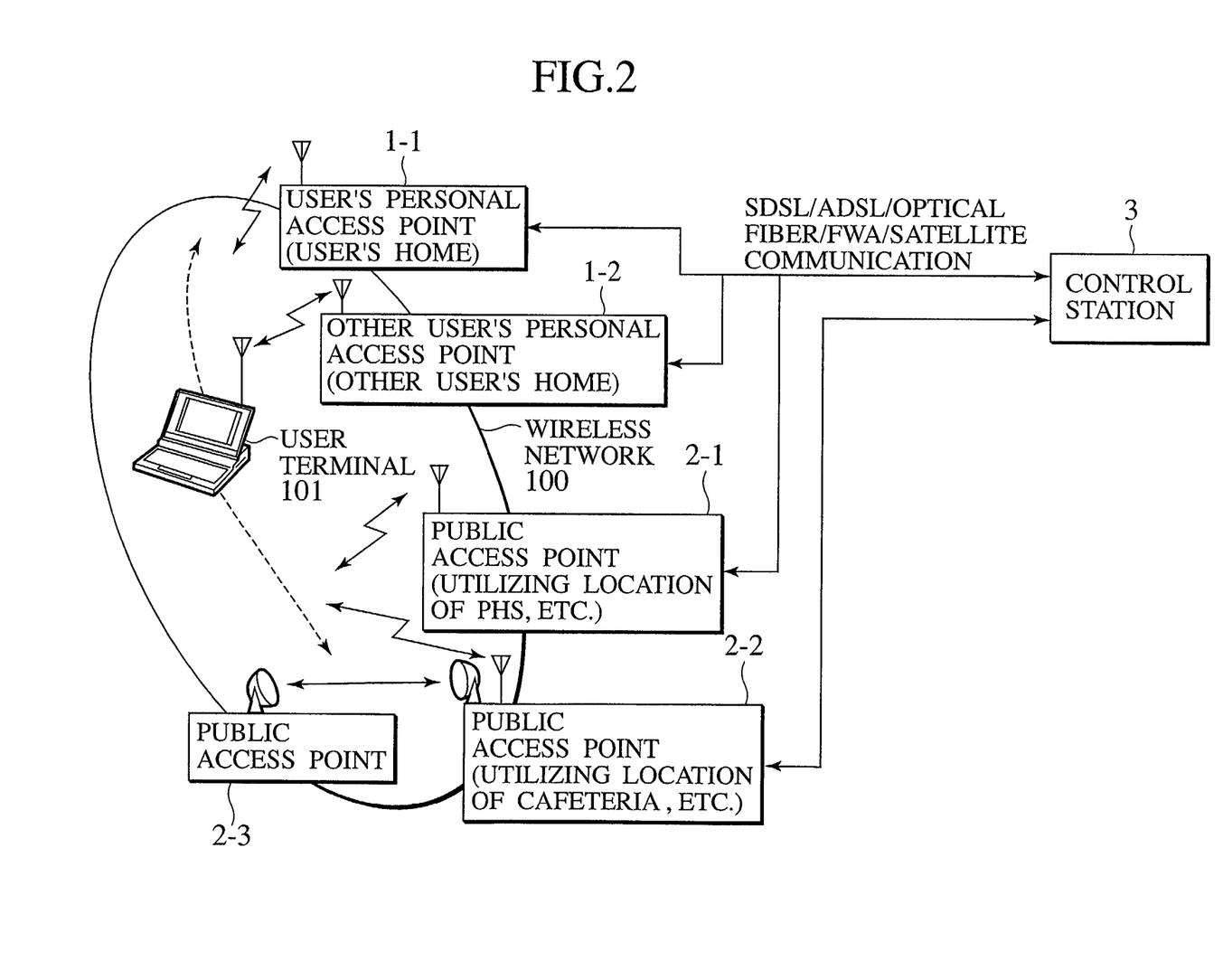
FIG. 2 is a diagram showing an exemplary access point set up state in a wireless communication system according to one embodiment of the present invention.
Figure 3:
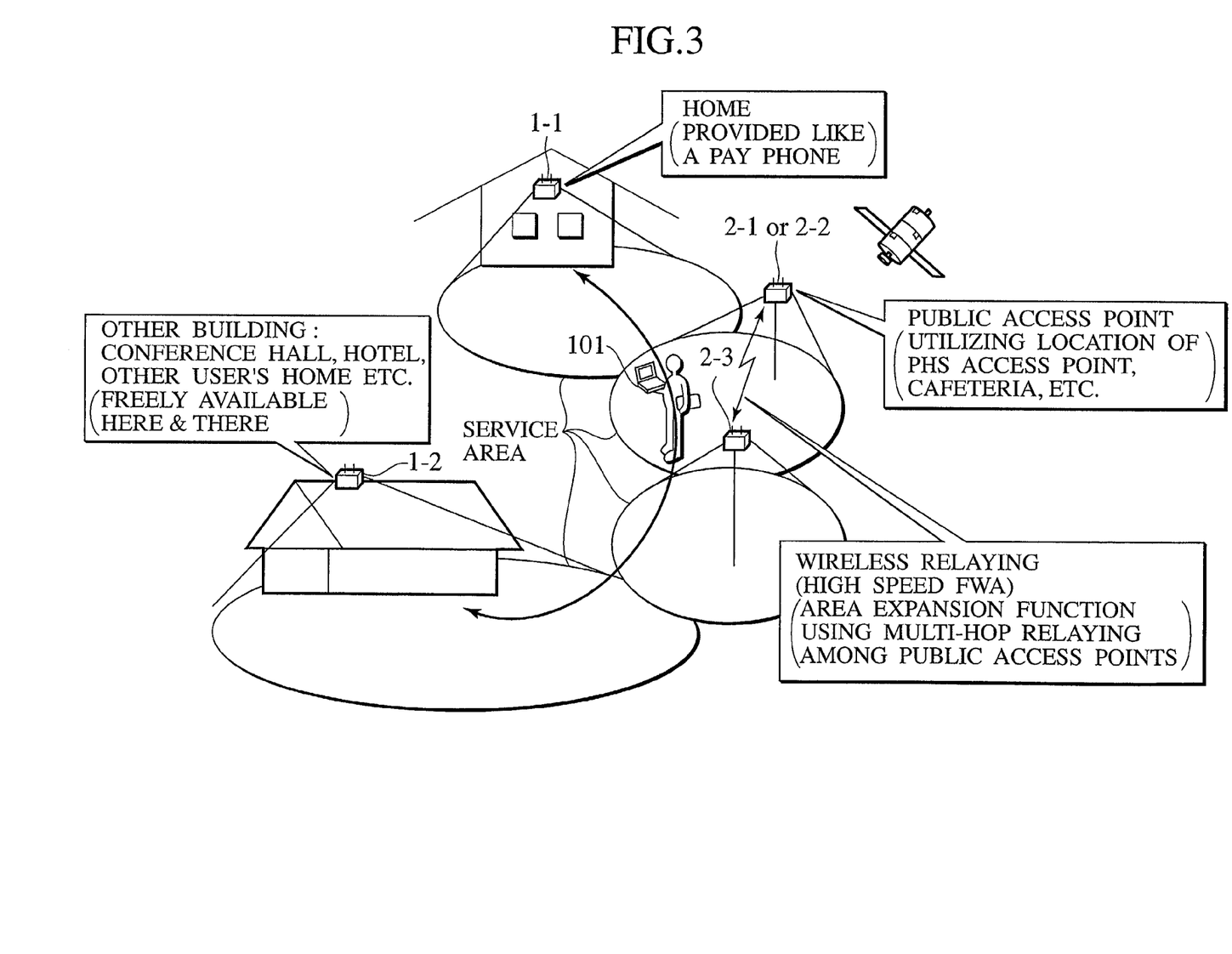
FIG. 3 is a diagram showing an exemplary access point set up state in a wireless communication system according to one embodiment of the present invention three-dimensionally.

The access point set up state in the wireless communication system of this embodiment will now be described with references to FIG. 2 and FIG. 3, where FIG. 3 shows the access point set up state shown in FIG. 2 three-dimensionally. In FIG. 2, two user's personal access points 1-1 and 1-2 and three public access points 2-1, 2-2 and 2-3 are set up. Each one of the user's personal access points 1-1 and 1-2 is required to be inexpensive as the set up cost is to be accounted by the user, and it is capable of carrying out communications at the communication rate in the order of Mbps. In contrast, each one of the public access points 2-1, 2-2 and 2-3 is required to have a high performance as it is set up by the communication service provider, and it is capable of carrying out communications at the communication rate in the order of 10 Mbps. Moreover, each one of the public access points 2-2 and 2-3 will carry out communications with each other for the purpose of the multi-hop relaying or the like so that it is capable of carrying out communications at the communication rate of about 100 Mbps by using FWA (Fixed Wireless Access).

In the example of FIG. 2, the public access point 2-1 is set up by utilizing a location of the PHS or the like, and the public access point 2-2 is set up by utilizing a location of a cafeteria or the like. In this configuration, the user can utilize the wireless communication system from both inside and outside of the home.

In this way, by using the wireless communication system of the present invention, it is possible to realize the wireless communication system capable of providing services that can meet the actual needs of the users over a wide area, while reducing the burden on the communication service provider regarding the initial investment and the access point set up negotiations. The user has a right to set up the user's personal access point by himself, and when the user's personal access point is set up by the user himself, this user acquires a right to utilize user's personal access points of the other users.

In FIG. 3, the user who set up the user's personal access point 1-1 at his home can obtain a membership right upon payment of the membership fee. Each member can utilize the user's personal access points of the other members. For example, this user can utilize the user's personal access point 1-2 that is set up in a building at the lower left portion of FIG. 3. Also, this user can utilize the public access points set up by the communication service provider such as an access point that is set up on a telephone pole, for example. Consequently, from a viewpoint of the user, once the user sets up at least one access point by himself, it becomes possible for the user to utilize services even when the user moves to various locations.

On the other hand, the communication service provider has an advantage in that the initial cost for starting services can be reduced as the users account for the access point costs. As shown in FIG. 3, it is also possible to use a configuration in which the access points are connected by the wireless multi-hop relaying, or the access point and the control station are connected through a communication satellite. Also, as shown in FIG. 2, it is possible to connect the access point and the control station by utilizing SDSL (Symmetric Digital Subscriber Line), ADSL (Asymmetric Digital Subscriber Line), optical fiber, FWA (Fixed Wireless Access), satellite communication, etc. It is also possible for a plurality of communication service providers to share one system.

Next, the authentication method for the purpose of carrying out communications over a plurality of control stations will be described with reference to FIG. 4. Note that FIG. 1 shows an exemplary case where the server authenticates the user terminal, whereas FIG. 4 shows an exemplary case of carrying out the authentication over a plurality of control stations. In this example, the authentication method has the features that the server side can authenticate both the access point and the user terminal, and each one of the access point and the user terminal has a function for authenticating the server.

As shown in FIG. 4, when the user who can carry out communications through the access points 1 and 2 controlled by the control station 3-1 moved to a region at which the access point 2-4 controlled by the control station 3-2 is set up, in order for this user to be authenticated by the control station 3-2 through the access point 2-4 controlled by the control station 3-2 so as to be able to carry out communications, the control stations 3-1 and 3-2 have functions for exchanging authentication information with each other and checking it.

More specifically, the user terminal 101 has a function for verifying that this terminal is connected with a legitimate server while being located within the wireless network 100, and that this terminal is connected with a legitimate server (a server of the control station 3-1) or its proxy (a server of the control station 3-2) while being located outside the wireless network 100. Each one of the access points 1 and 2 has a function for verifying that this access point is connected with a legitimate server. The server 6 has a function for authenticating the access point at a time of setting up the access point and at a time of communication, and a function for authenticating the user terminal. Each one of the control stations 3-1 and 3-2 has a function for enabling communications over the control stations by exchanging and checking information of the user with the other control station.

It is also possible for the wireless communication system of the present invention to use the end-to-end secret communication scheme, and to this end, it suffices to implement the secret communication scheme such as IPsec at the server and the user terminal, for example.

Referring now to FIG. 5 to FIG. 11, another embodiment of a wireless communication system according to the present invention will be described in detail.

Figure 5:
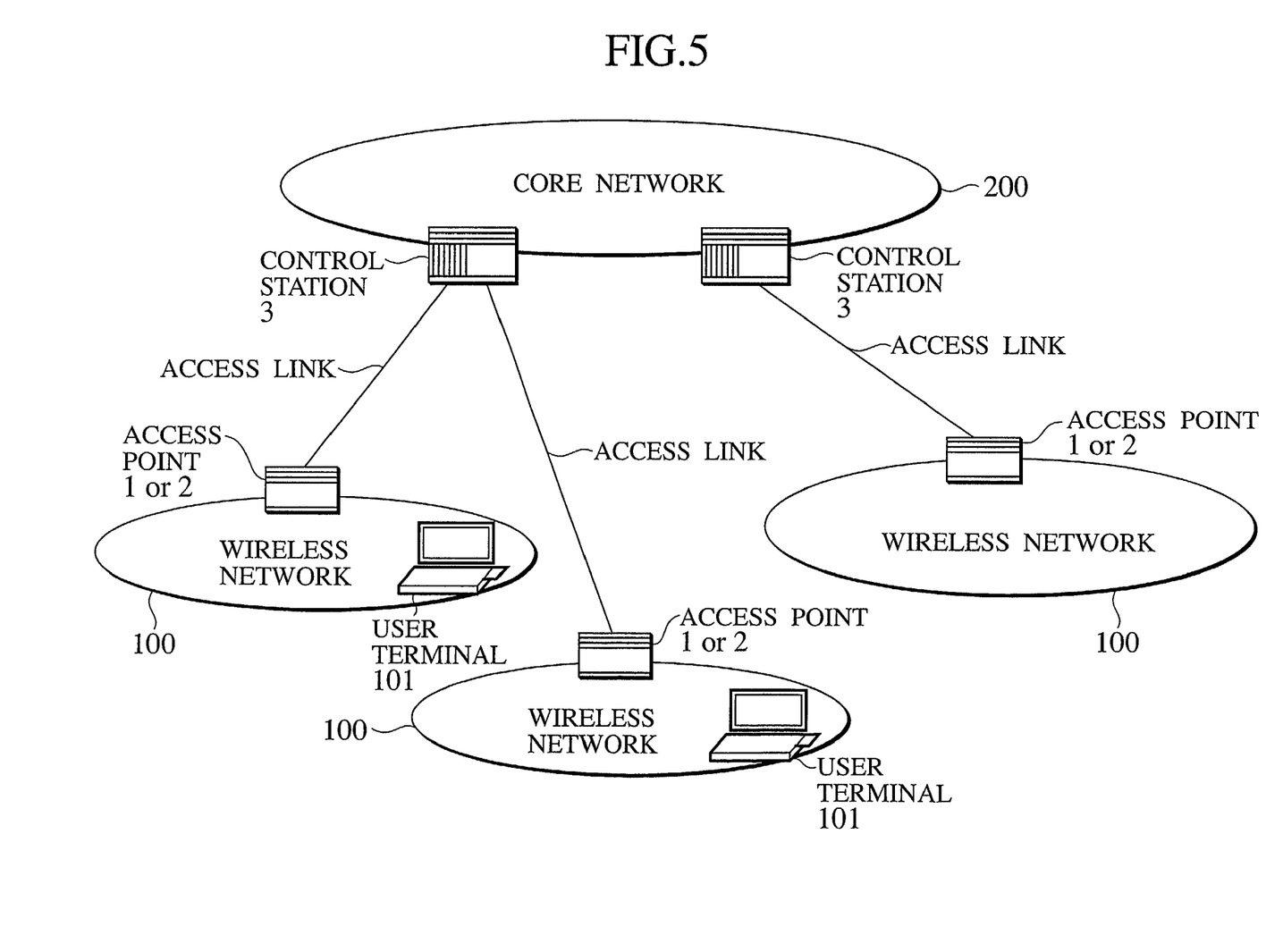
FIG. 5 is a diagram showing one exemplary overall configuration of a wireless communication system according to another embodiment of the present invention.

FIG. 5 shows one exemplary overall configuration of the wireless communication system in this embodiment. As shown in FIG. 5, the wireless communication system has a plurality of access points 1 or 2 constituting a plurality of wireless networks 100 to which user terminals 101 can make accesses, and a plurality of control stations 3 constituting a core network 200 which are connected with the plurality of access points 1 or 2 through access links.

Figure 6:
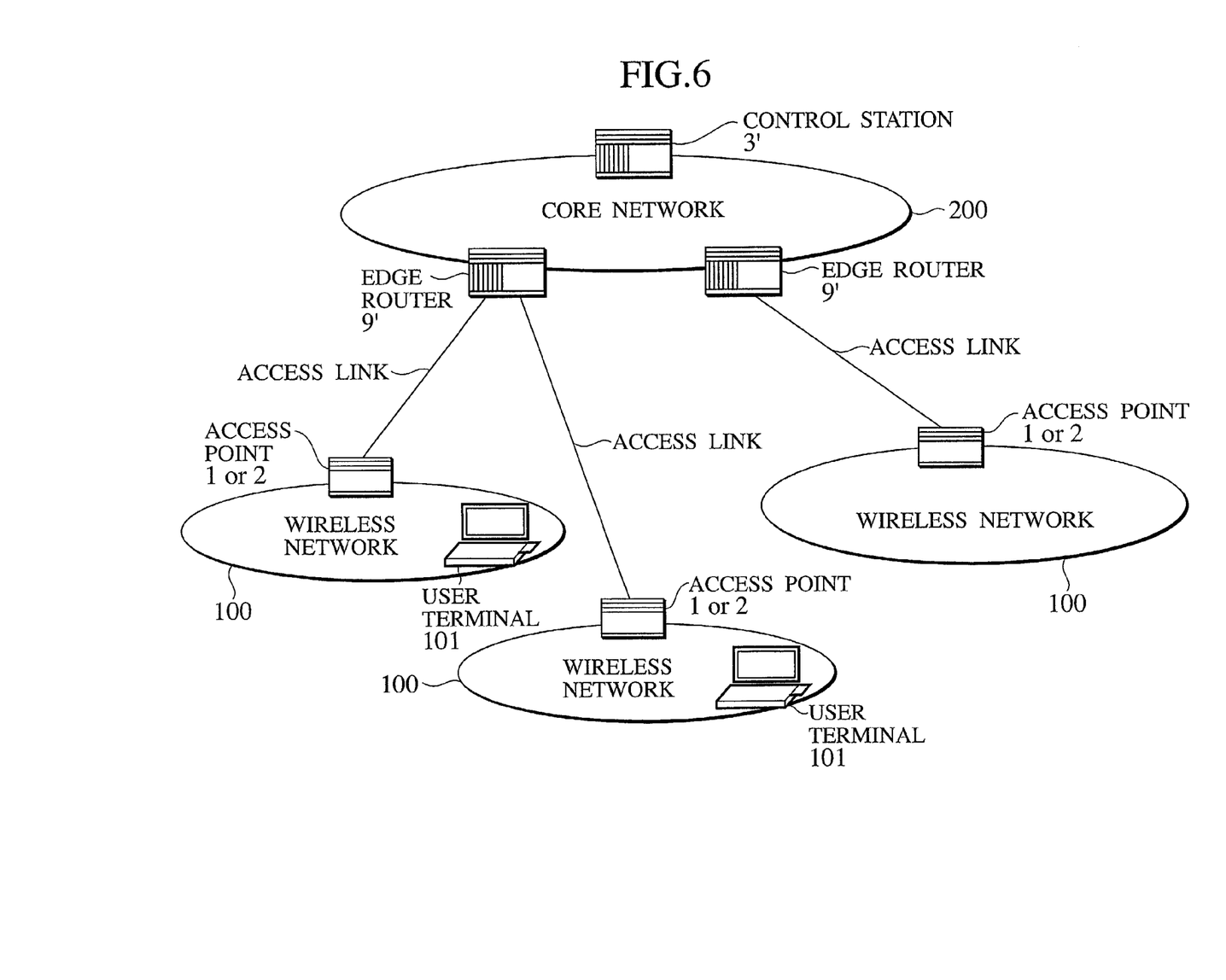
FIG. 6 is a diagram showing another exemplary overall configuration of a wireless communication system according to another embodiment of the present invention.

FIG. 6 shows another exemplary overall configuration of the wireless communication system in this embodiment, which differs from that of FIG. 5 in that the control stations 3 on the core network 200 are divided into edge routers 9' which are connected with the plurality of access points 1 or 2 through the access links, and a control station 3' connected with the edge routers 5' through the core network 200.

Figure 7:
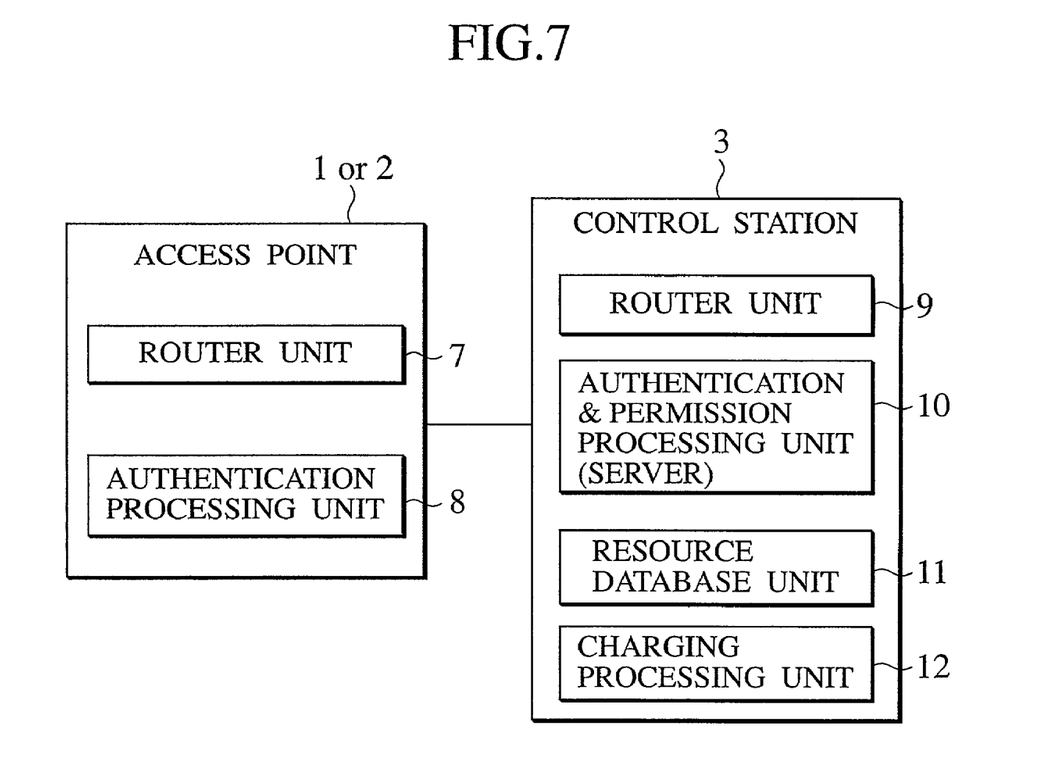
FIG. 7 is a block diagram showing exemplary configurations of an access point and a control station in the wireless communication system of FIG. 5.

FIG. 7 shows an exemplary configuration of the access point 1 or 2 and the control station 3 in the wireless communication system of FIG. 5.

In this case, the access point 1 or 2 has a router unit 7 with a packet transfer function, a bandwidth control function, a traffic amount monitoring function, and a control signal transmission/reception function, and an authentication processing unit 8 with a member (terminal) authentication function and an access point authentication function.

Also, in this case, the control station 3 has a router unit 9 with a packet transfer function, a bandwidth control function, a traffic amount monitoring function, and a control signal transmission/reception function, an authentication and permission processing unit (server) 10 with a member (terminal) authentication and permission function and an access point authentication function, a resource database unit 11 with an access point utilization level by other users management function and an other access point utilization level by each user management function, and a charging processing unit 12.

Figure 8:
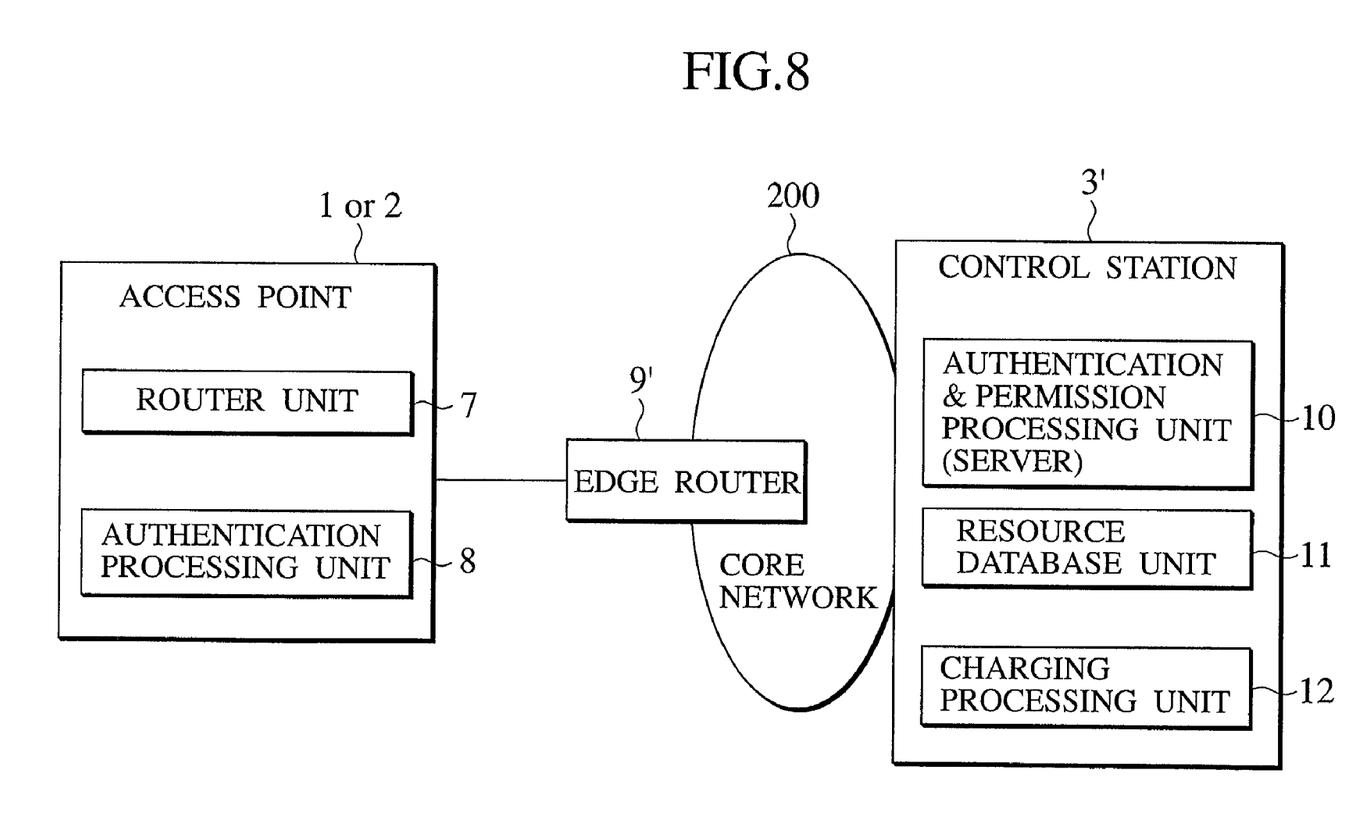
FIG. 8 is a block diagram showing exemplary configurations of an access point, an edge router and a control station in the wireless communication system of FIG. 6.

FIG. 8 shows an exemplary configuration of the access point 1 or 2 and the control station 3 in the wireless communication system of FIG. 6.

In this case, the access point 1 or 2 has the router unit 7 and the authentication processing unit 8 similarly as in the case of FIG. 5. Also, the control station 3' has the authentication and permission processing unit (server) 10, the resource database unit 11, and the charging processing unit 12, similarly as in the case of FIG. 5 except that the router unit 9 is omitted. The edge router 9' has a packet transfer function, a bandwidth control function, a traffic amount monitoring function, and a control signal transmission/ reception function, similarly as the router unit 9.

Figure 9:
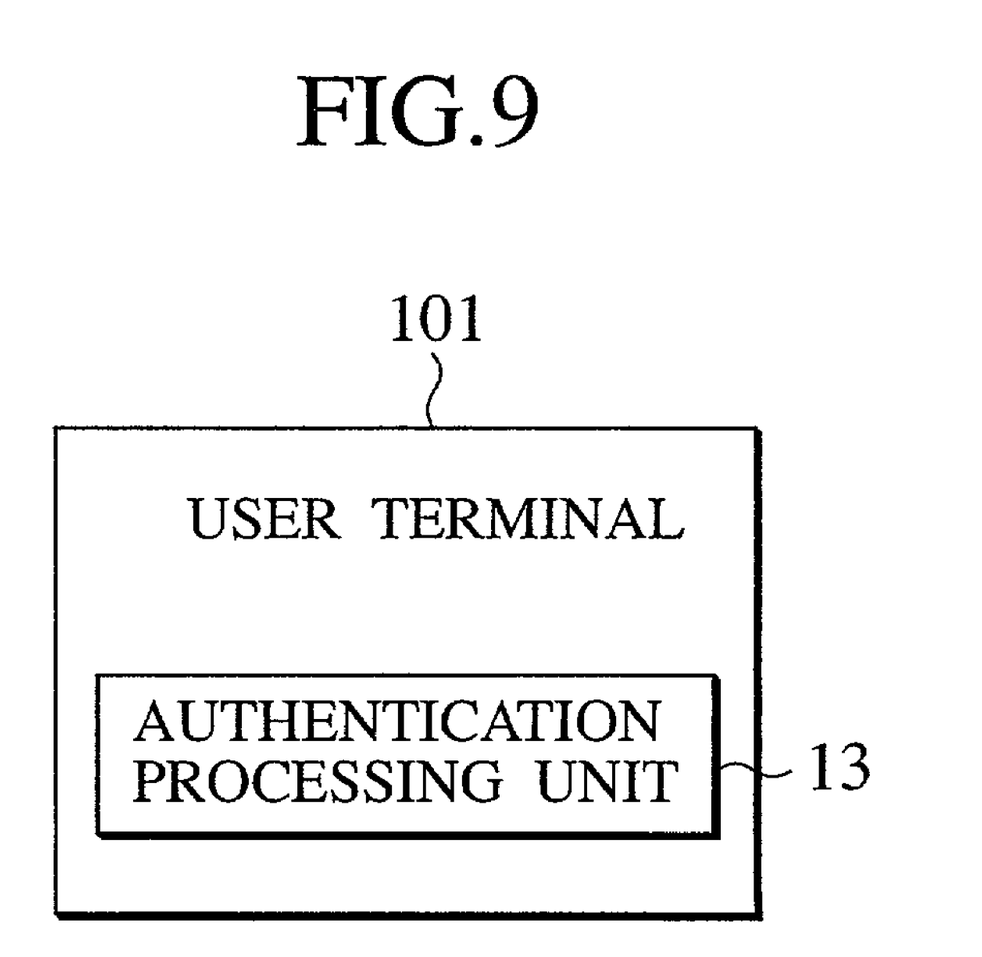
FIG. 9 is a block diagram showing an exemplary configuration of a user terminal in the wireless communication system of FIG. 5 or FIG. 6.

FIG. 9 shows an exemplary configuration of the user terminal 101 in the wireless communication system of FIG. 5 or FIG. 6. In this case, the user terminal 101 has an authentication processing unit 13 with a member (terminal) authentication function and an access point authentication function.

In this embodiment, the router unit 7 of the access point 1 or 2 and either the router unit 9 of FIG. 7 or the edge router 9' of FIG. 8 of the control station 3 or 3' have the bandwidth control function for controlling the bandwidth of the traffic outputted toward the access link, and the control signal transmission/reception function for exchanging a bandwidth control setting signal.

Figure 10:
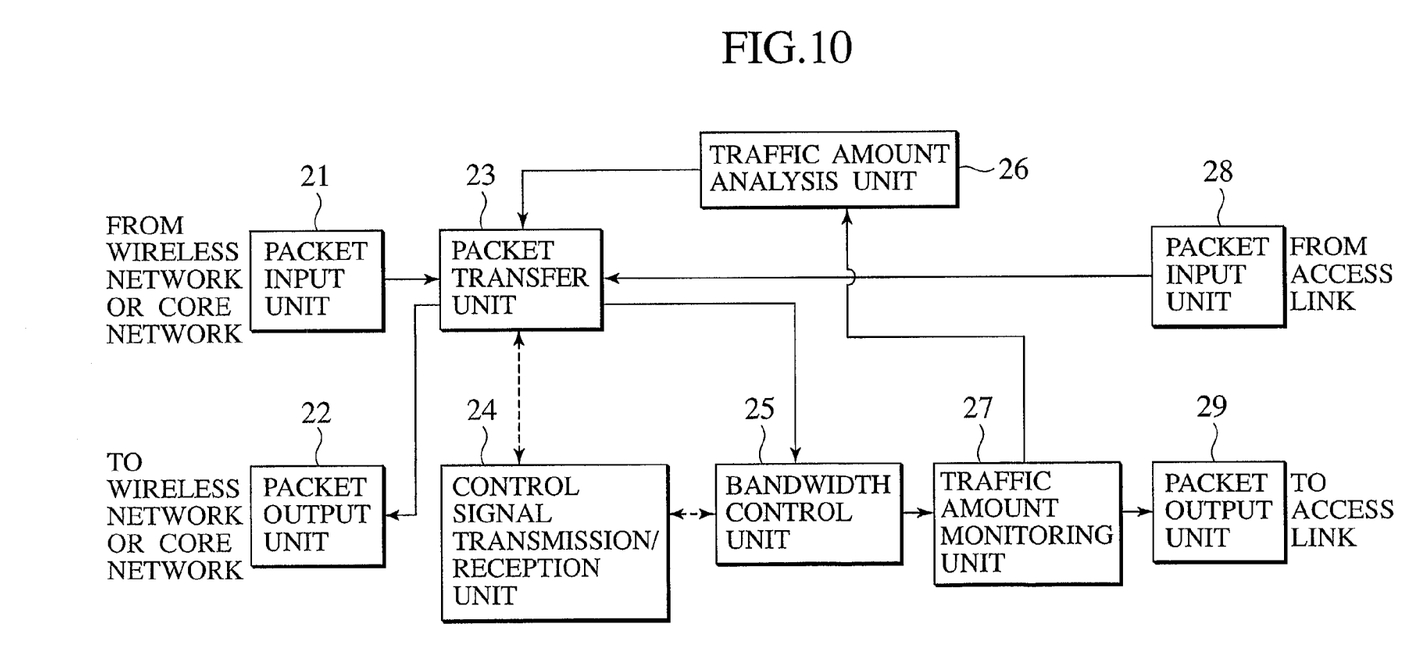
FIG. 10 is a block diagram showing an exemplary internal configuration of a router unit of an access point, a control station or an edge router in the wireless communication system of FIG. 5 or FIG. 6.

FIG. 10 shows an exemplary internal configuration of each one of the router unit 7 of the access point 1 or 2 and the router unit 9 of FIG. 7 or the edge router 9' of FIG. 8. In this case, the router unit comprises a packet input unit 21 and a packet output unit 22 which are connected to the wireless network 100 or the core network 200, a packet input unit 28 and a packet output unit 29 which are connected with the access link, a packet transfer unit 23 connected with the packet input units 21, the packet output unit 22 and the packet input unit 28, a control signal transmission/reception unit 24 connected with the packet transfer unit 23, a bandwidth control unit 25 connected with the packet transfer unit 23 and the control signal transmission/reception unit 24, a traffic amount analysis unit 26 connected with the packet transfer unit 23, and a traffic amount monitoring unit 27 connected with the bandwidth control unit 25, the traffic amount analysis unit 26 and the packet output unit 29.

In the case of the bandwidth control setting from the user side, the control signal transmission/reception unit 24 in the router unit 7 of the access point 1 or 2 receives a request for the bandwidth control setting from an external terminal (the user terminal 101 connected to the wireless network 100, for example), and the bandwidth control unit 25 in the router unit 7 of the access point 1 or 2 makes the bandwidth setting inside the access point 1 or 2 according to the request, while the control signal transmission/reception unit 24 transmits the bandwidth setting signal to the control signal transmission/reception unit 24 in the router unit 9 of the control station 3 or the edge router 9'. Then, the control signal transmission/reception unit 24 in the router unit 9 of the control station 3 or the edge router 9' receives the bandwidth setting signal from the access point 1 or 2, and the bandwidth control unit 25 in the router unit 9 of the control station 3 or the edge router 9' makes the bandwidth setting inside the control station 3 or the edge router 9' according to the bandwidth setting signal.

In the case of the bandwidth control setting from the an operator side, the control signal transmission/reception unit 24 in the router unit 9 of the control station 3 or the edge router 9' receives a request for the bandwidth control setting from an external terminal, and the bandwidth control unit 25 in the router unit 9 of the control station 3 or the edge router 9' makes the bandwidth setting inside the control station 3 or the edge router 9' according to the request, while the control signal transmission/reception unit 24 transmits the bandwidth setting signal to the control signal transmission/ reception unit 24 in the router unit 7 of the access point 1 or 2. Then, the control signal transmission/reception unit 24 in the router unit 7 of the access point 1 or 2 receives the bandwidth setting signal from the control station 3 or the edge router 9', and the bandwidth control unit 25 in the router unit 7 of the access point 1 or 2 makes the bandwidth setting inside the access point 1 or 2 according to the bandwidth setting signal.

Figure 11:
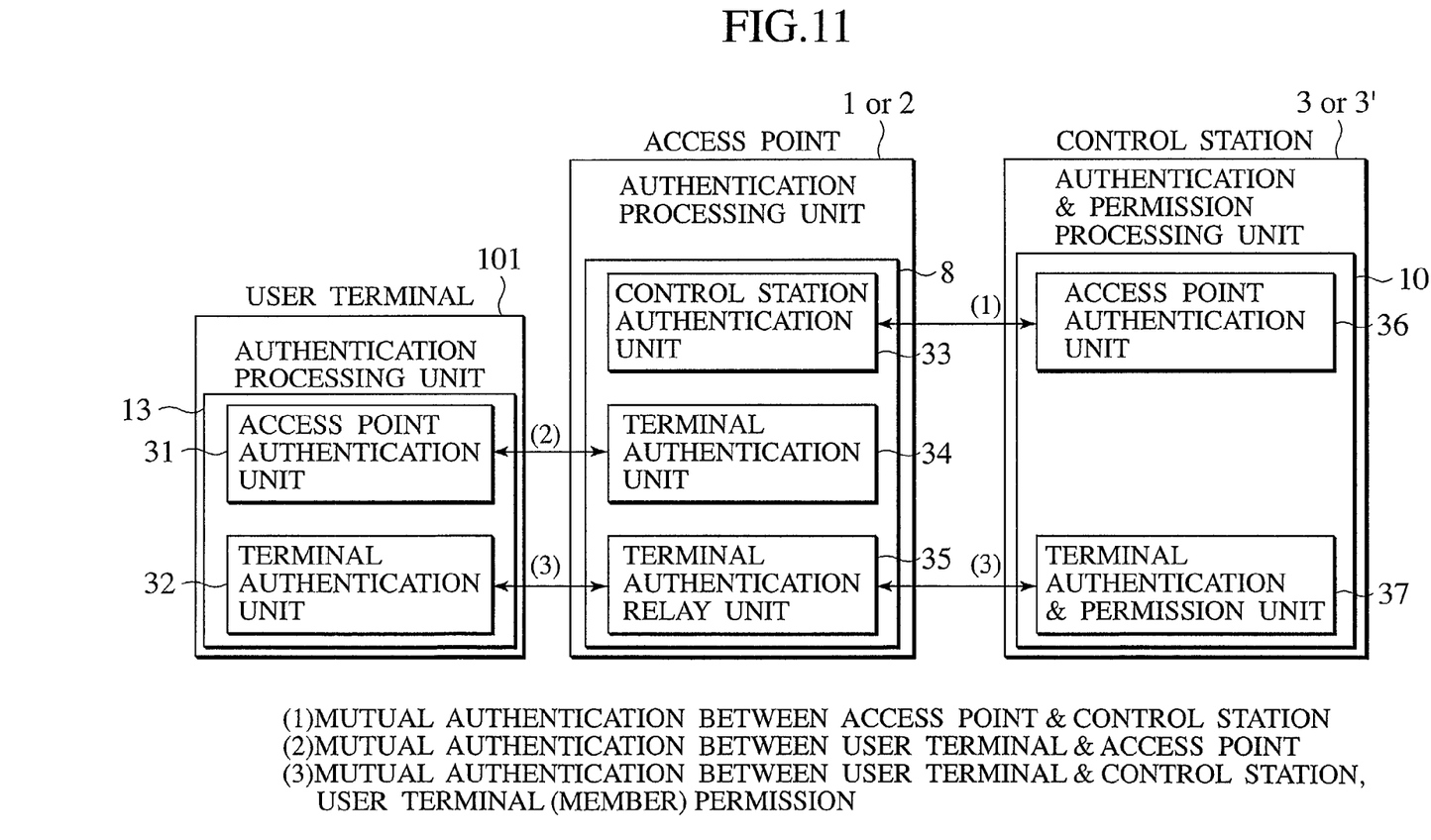
FIG. 11 is a block diagram showing exemplary internal configurations of an authentication processing unit of a user terminal and an access point, and an authentication and permission processing unit of a control station in the wireless communication system of FIG. 5 or FIG. 6.

FIG. 11 shows an exemplary internal configuration of the authentication processing unit 13 of the user terminal 101, the authentication processing unit 8 of the access point 1 or 2 and the authentication and permission processing unit 10 of the control station 3 or 3'. In this case, the authentication processing unit 13 of the user terminal 101 comprises an access point authentication unit 31 and a terminal authentication unit 32. The authentication processing unit 8 of the access point 1 or 2 comprises a control station authentication unit 33, a terminal authentication unit 34, and a terminal authentication relay unit 35. The authentication and permission processing unit 10 of the control station 3 or 3' comprises an access point authentication unit 36 and a terminal authentication and permission unit 37.

In this configuration of FIG. 11, at a time of the power ON or the reset of the access point 1 or 2, and at any later timing according to the need, the mutual authentication is carried out between the control station authentication unit 33 in the authentication processing unit 8 of the access point 1 or 2 and the access point authentication unit 36 in the authentication and permission processing unit 10 of the control station 3 or 3'.

Then, when the user terminal 101 makes access to the access point 1 or 2 for the first time, and at any later timing according to the need, the mutual authentication is carried out between the access point authentication unit 31 in the authentication processing unit 13 of the user terminal 101 and the terminal authentication unit 34 in the authentication processing unit 8 of the access point 1 or 2. When this authentication succeeds, the authentication and permission processing between the user terminal 101 and the control station 3 or 3' is permitted.

Then, the terminal authentication unit 32 in the authentication processing unit 13 of the user terminal 101 transfers a packet for the authentication and permission processing with the control station 3 or 3' to the access point 1 or 2. The terminal authentication relay unit 35 in the authentication processing unit 8 of the access point 1 or 2 transfers this packet to the control station 3 or 3' if the mutual authentication between the user terminal 101 and the access point 1 or 2 is already completed successfully. When the authentication and permission processing for this user terminal 101 succeeds at the terminal authentication and permission unit 37 in the authentication and permission processing unit 10 of the control station 3 or 3', the access point 1 or 2 starts to transfer packets destined to this user terminal 101 or packets originating from this user terminal 101.

As described, according to the present invention, it is possible to provide a wireless communication system in which a system with a wide service area that can meet the actual needs of the users can be constructed by the users themselves while reducing the burden on the communication service provider. In addition, it is also possible to provide a wireless communication system capable of improving the fairness of the costs to be accounted by the users.

It is to be noted that the wireless communication system of the present invention as described above may be modified to provide additional access points subordinate to the access point 1 or 2.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A wireless communication system, comprising:
   a plurality of access points constituting a wireless network, through which user terminals make accesses; and
   at least one control station configured to control the access points;
   wherein public access points which are systematically set up by a manager of the control station are included among the plurality of access points,
   the control station is adapted to accommodate user's personal access points that are freely set up and connected to the wireless network by users at desired locations according to needs of users such that the user's personal access points are included among the plurality of access points, the control station having:
   a server unit configured to measure a utilization level of each user's personal access point and charge an owner of each user's personal access point according to a measured utilization level; and
   a router unit configured to set up relay routes using the public access points and the user's personal access points; and
   the server unit of the control station is configured to determine whether or not to permit a connection between a user terminal of each user and another user's personal access point or public access point according to an authentication result obtained by carrying out a mutual authentication with the another user's personal access point or public access point, and carrying out a mutual authentication with the user terminal of each user through the another user's personal access point or public access point after a mutual authentication between the control station and the another user's personal access point or public access point is successfully completed and a mutual authentication between the another user's personal access point or public access point and the user terminal of each user is successfully completed.

2. The wireless communication system of claim 1, wherein the server unit is adapted to charge the owner of each user's personal access point by accounting for a frequency by which each user's personal access point is utilized by users other than the owner of each user's personal access point.

3. The wireless communication system of claim 1, wherein the control station is adapted to enable the owner of each user's personal access point and users other than the owner of each user's personal access point to share a whole of a part of wireless resources of each user's personal access point and a bandwidth of an access link between each user's access point and the control station.

4. The wireless communication system of claim 3, wherein the router unit of the control station is adapted to control the bandwidth inside the control station or each user's personal access point by exchanging a bandwidth setting signal with each user's personal access point.

5. The wireless communication system of claim 1, wherein the server unit of the control station is also configured to authenticate each user and a user's personal access point set up by each user, and determine whether or not to permit a connection between a user terminal of each user and an access point according to an authentication result.

6. The wireless communication system of claim 5, wherein the server unit of the control station is configured to determine whether or not to permit a connection between a user terminal of each user and the user's personal access point according to an authentication result obtained by carrying out a mutual authentication with the user's personal access point, and carrying out a mutual authentication with the user terminal of each user through the user's personal access point after a mutual authentication between the control station and the user's personal access point is successfully completed and a mutual authentication between the user's personal access point and the user terminal of each user is successfully completed.

7. The wireless communication system of claim 1, wherein the server unit of the control station is also configured to set up service classes with respect to the users, and to control a connection priority level and a relay route communication quality according to a service class of each user.

8. The wireless communication system of claim 1, wherein the control station is interconnected with a plurality of other control stations and the router unit of each control station is also configured to carry out inter-control station communications with other control stations.

9. The wireless communication system of claim 1, wherein the server unit of the control station is also configured to give a benefit to the owner of each user's personal access point according to the frequency by which each user's personal access point is utilized by users other than the owner of each user's personal access point.

10. The wireless communication system of claim 9, wherein the server unit of the control station is configured to give the benefit in a form of discounting a utilization fee of each user's personal access point.

11. A control station apparatus for use in a wireless communication system formed by a plurality of access points constituting a wireless network, through which user terminals make accesses, and at least one control station configured to control the access points, public access points which are systematically set up by a manager of the control station are included among the plurality of access points, the control station apparatus being adapted to accommodate user's personal access points that are freely set up and connected to the wireless network by users at desired locations according to needs of users such that the user's personal access points are included among the plurality of access points, and the control station apparatus comprising:
 a server unit configured to measure a utilization level of each user's personal access point and charge an owner of each user's personal access point according to a measured utilization level; and
 a router unit configured to set up relay routes using the public access points and the user's personal access points; and
 wherein the server unit is configured to determine whether or not to permit a connection between a user terminal of each user and another user's personal access point or public access point according to an authentication result obtained by carrying out a mutual authentication with the another user's personal access point or public access point, and carrying out a mutual authentication with the user terminal of each user through the another user's personal access point or public access point after a mutual authentication between the control station and the another user's personal access point or public access point is successfully completed and a mutual authentication between the another user's personal access point or public access point and the user terminal of each user is successfully completed.

12. The control station apparatus of claim 11, wherein the server unit is adapted to charge the owner of each user's personal access point by accounting for a frequency by which each user's personal access point is utilized by users other than the owner of each user's personal access point.

13. The control station apparatus of claim 11, wherein the control station apparatus is adapted to enable the owner of each user's personal access point and users other than the owner of each user's personal access point to share a whole or a part of wireless resources of each user's personal access point and a bandwidth of an access link between each user's access point and the control station apparatus.

14. The control station apparatus of claim 13, wherein the router unit is adapted to control the bandwidth inside the control station apparatus or each user's personal access point by exchanging a bandwidth setting signal with each user's personal access point.

15. The control station apparatus of claim 11, wherein the server unit is also configured to authenticate each user and a user's personal access point set up by each user, and determine whether or not to permit a connection between a user terminal of each user and an access point according to an authentication result.

16. The control station apparatus of claim 15, wherein the server unit is configured to determine whether or not to permit a connection between a user terminal of each user and the user's personal access point according to an authentication result obtained by carrying out a mutual authentication with the user's personal access point, and carrying out a mutual authentication with the user terminal of each user through the user's personal access point after a mutual authentication between the control station and the user's personal access point is successfully completed and a mutual authentication between the user's personal access point and the user terminal of each user is successfully completed.

17. The control station apparatus of claim 11, wherein the server unit is also configured to set up service classes with respect to the users, and control a connection priority level and a relay route communication quality according to a service class of each user.

18. The control station apparatus of claim 11, wherein the at least one control station is interconnected with a plurality of other control stations and the router unit is also configured to carry out inter-control station communications with other control stations.

19. The control station apparatus of claim 11, wherein the server unit is also configured to give a benefit to the owner of each user's personal access point according to the frequency by which each user's personal access point is utilized by users other than the owner of each user's personal access point.

20. The control station apparatus of claim 19, wherein the server unit is configured to give the benefit in a form of discounting a utilization fee of each user's personal access point.

21. An access point apparatus for use as a user's personal access point in a wireless communication system formed by a plurality of access points constituting a wireless network, through which user terminals make accesses, and at least one control station configured to control the access points, public access points which are systematically set up by a manager of the control station are included among the plurality of access points, the control station being adapted to accommodate user's personal access points that are freely set up and connected to the wireless network by users at desired locations according to needs of users such that the user's personal access points are included among the plurality of access points, and the access point apparatus comprising:
 an authentication processing unit configured to carry out a mutual authentication with the control station, a mutual authentication with the user terminal after the mutual authentication wit to control station is successfully completed, and relay information for a mutual authentication between the user terminal and the control station after the mutual authentication wit the control station is successfully completed and the mutual authentication with the user terminal is successfully completed; and a router unit configured to set up relay routes using the public access points and the user's personal access points.

22. The access point apparatus of claim 21, wherein the router unit is also configured to count a frequency by which the user's personal access point is utilized by users other than an owner of the user's personal access point, such that the owner of the user's personal access point will be charged according to a utilization level of the user's personal access point based on the frequency by which the user's personal access point is utilized by users other than the owner of the user's personal access point.

23. The access point apparatus of claim 21, wherein the router unit controls a bandwidth inside the user's personal access point or the control station by exchanging a bandwidth setting signal with the user terminal or the control station.

24. A method for operating a wireless communication system formed by a plurality of access points constituting a wireless network, through which user terminals make accesses, and at least one control station configured to control the access points, the method comprising the steps of:

systematically setting up public access points by a manager of the control station such that the public access points are included among the plurality of access points, and accommodating user's personal access points that are freely set up and connected to the wireless network by users at desired locations according to needs of users such that the user's personal access points are included among the plurality of access points, by operating the control station to measure a utilization level of each user's personal access point and charge an owner of each user's personal access point according to a measured utilization level, and set up relay routes using the public access points and the user's personal access points;

wherein at the accommodating step, the control station determines whether or not to permit a connection between a user terminal of each user and another user's personal access point or public access point according to an authentication result obtained by carrying out a mutual authentication with the another user's personal access point or public access point, and carrying out a mutual authentication with the user terminal of each user through the another user's personal access point or public access point after a mutual authentication between the control station and the another user's personal access point or public access point is successfully completed and a mutual authentication between the another user's personal access point or public access point and the user terminal of each user is successfully completed.

25. The method of claim 24, wherein at the accommodating step, the control station charges the owner of each user's personal access point by accounting for a frequency by which each user's personal access point is utilized by users other than the owner of each user's personal access point.

26. The method of claim 24, wherein at the accomodatig step, the control station is operated to enable the owner of each user's personal access point and users other than the owner of each user's personal access point to share a whole of a part of wireless resources of each user's personal access point and a bandwidth of an access link between each user's access point and the control station.

27. The method of claim 26, further comprising the step of operating the control station to control the bandwidth inside the control station or each user's personal access point by exchanging a bandwidth setting signal with each user's personal access point.

28. The method of claim 24, wherein at the accommodating step, the control station authenticates each user and a user's personal access point set up by each user, and determines whether or not to permit a connection between a user terminal of each user and an access point according to an authentication result.

29. The method of claim 28, wherein at the accommodating step, the control station determines whether or not to permit a connection between a user terminal of each user and the user's personal access point according to an authentication result obtained by carrying out a mutual authentication with the user's personal access point, and carrying out a mutual authentication with the user terminal of each user through the user's personal access point after a mutual authentication between the control station and the user's personal access point is successfully completed and a mutual authentication between the user's personal access point and the user terminal of each user is successfully completed.

30. The method of claim 24, further comprising the steps of:

setting up service classes with respect to the users; and operating the control station to control a connection priority level and a relay route communication quality according to a service class of each user.

31. The method of claim 24, wherein one control station is interconnected with a plurality of control stations and the method further comprises the step of carrying out inter-control station communications at each control station with other control stations.

32. The method of claim 24, wherein at the accommodating step, the control station is operated to give a benefit to the owner of each user's personal access point according to the frequency by which each user's personal access point is utilized by users other than the owner of each user's personal access point.

33. The method of claim 32, wherein at the accommodating step, the control station gives the benefit in a form of discounting a utilization fee of each user's personal access point.

* * * * *